(12) United States Patent
Nakano et al.

(10) Patent No.: US 7,446,832 B2
(45) Date of Patent: Nov. 4, 2008

(54) ELECTRO-OPTICAL DEVICE WITH LIGHT SHIELD MADE OF SMALL TO LARGER WIDTH COLORED LAYERS BETWEEN ADJACENT DOT REGIONS ON COLORED FILTER SUBSTRATE

(75) Inventors: Tomoyuki Nakano, Toyoshina-machi (JP); Keiji Takizawa, Toyoshina-machi (JP); Kimitaka Kamijo, Shiojiri (JP); Tatsuya Kato, Matsumoto (JP)

(73) Assignee: Seiko Epson Corporation (JP)

( * ) Notice: Subject to any disclaimer, the term of this patent is extended or adjusted under 35 U.S.C. 154(b) by 428 days.

(21) Appl. No.: 11/205,328

(22) Filed: Aug. 16, 2005

(65) Prior Publication Data
US 2006/0038938 A1    Feb. 23, 2006

(30) Foreign Application Priority Data
Aug. 17, 2004    (JP)    ............................. 2004-237084

(51) Int. Cl.
*G02F 1/1335*    (2006.01)
(52) U.S. Cl. ...................................... 349/106; 349/110

(58) Field of Classification Search ................. 349/106, 349/110
See application file for complete search history.

(56) References Cited

U.S. PATENT DOCUMENTS

| 4,470,667 A | * | 9/1984 | Okubo et al. | ................. 349/42 |
| 2003/0016459 A1 | * | 1/2003 | Takizawa et al. | ............ 359/885 |

FOREIGN PATENT DOCUMENTS

| JP | 10-073813 | 3/1998 |
| JP | 2003-172946 | 6/2003 |

* cited by examiner

*Primary Examiner*—David C. Nelms
*Assistant Examiner*—John Heyman
(74) *Attorney, Agent, or Firm*—Harness, Dickey & Pierce, P.L.C.

(57) ABSTRACT

An electro-optical device includes a substrate that supports an electro-optical material; a plurality of display dot regions; and a light-shielding film that is provided among the plurality of display dot regions on the substrate and that is formed by laminating a plurality of colored layers. In the electro-optical device, one of the plurality of colored layers is formed such that both ends thereof in a widthwise direction protrude from edges of the other colored layers.

4 Claims, 10 Drawing Sheets

ELECTRO-OPTICAL DEVICE WITH LIGHT SHIELD MADE OF SMALL TO LARGER WIDTH COLORED LAYERS BETWEEN ADJACENT DOT REGIONS ON COLORED FILTER SUBSTRATE

RELATED APPLICATIONS

This application claims priority to Japanese Patent Application No. 2004-237084 filed Aug. 17, 2004 which is hereby expressly incorporated by reference herein in its entirety.

BACKGROUND OF THE INVENTION

1. Technical Field

The present invention relates to a substrate used for an electro-optical device, such as a liquid crystal display device. Further, the invention relates to an electro-optical device, such as a liquid crystal display device, and to an electronic apparatus including the same.

2. Related Art

Electro-optical devices, such as liquid crystal display devices, have come into widespread use for electronic apparatuses, such as a mobile phone and a personal digital assistant. For instance, the electro-optical device has been used as a display device for displaying various information items related to the electronic apparatus. The electro-optical device is for controlling an optical output by means of an electrical input, and for example, includes a liquid crystal display device, an EL (electroluminescent) device, a plasma display device, and so forth.

For example, in the liquid crystal display device, a pair of substrates are provided with electrodes, respectively, and a liquid crystal layer composed of an electro-optical material is interposed between the electrodes. A voltage applied to the electrodes is controlled, which causes the alignment of liquid crystal molecules in the liquid crystal layer to be controlled, so that light incident on the liquid crystal layer is modulated by the alignment control. The pair of electrodes overlap each other in a plurality of dot regions that are arranged in the longitudinal and transverse directions. These dot regions constitute display dot regions, which are display units. When color display is carried out by three primary colors of blue, green, and red, a set of three display dot regions corresponding to these three colors constitutes one pixel. Meanwhile, when monochromatic display is carried out by white and black, or two arbitrary colors, one display dot region constitutes one pixel.

In general, in order to increase display contrast, a light-shielding layer is formed around the display dot regions. In the related art, there has been known a technique in which the light-shielding layer is formed by laminating any two colored layers of a plurality of colored layers, for example, three colored layers of blue, green, and red (for example, see Japanese Unexamined Patent Application Publication No. 10-073813 (page 3 and FIG. 1). In this manner, when the light-shielding layer is fabricated by laminating colored layers having different colors, the colored layers having different colors are laminated at the same position with the same width by a photolithography method, and are then patterned.

In the photolithography method, a resist film is formed on a colored-layer forming material to be patterned, and is then exposed through an exposing mask by an exposure apparatus. As the exposure apparatus, for example, a stepper or a batch exposure apparatus is used. At the time of the exposure process, when patterning is performed after one colored layer is laminated on another colored layer, a positioning process, i.e., an alignment process is performed between these colored layers.

When this alignment process is exactly performed, a desired light-shielding layer is formed, and thus color display having a desired color property is obtained. However, in the currently performed alignment process, it is difficult to completely remove misalignment when the colored layers are laminated. The use of the stepper as the exposure apparatus makes it possible to reduce the degree of the misalignment to a minimum, as compared to when using the batch exposure apparatus, but it is still difficult to completely remove the misalignment.

When the misalignment occurs between the laminated colored layers, one colored layer projects from an edge portion of the light-shielding layer. As a result, the entire base color of display is greatly affected by the color of the projecting colored layer. Further, when the misalignment occurs between the colored layers, color irregularity occurs due to the color of the colored layer projecting from the edge of the light-shielding layer. As a result, a variation in the entire base color of display occurs between a plurality of manufactured liquid crystal display devices.

SUMMARY

An advantage of the invention is that it prevents a variation in a display color although positional deviation occurs between colored layers having different colors when the colored layers are laminated to form a light-shielding layer.

According to an aspect of the invention, an electro-optical device includes a substrate that supports an electro-optical material; a plurality of display dot regions; and a light-shielding film that is provided among the plurality of display dot regions on the substrate and that is formed by laminating a plurality of colored layers. In the electro-optical device, one of the plurality of colored layers is formed such that both ends thereof in a widthwise direction protrude from edges of the other colored layers.

Herein, the 'electro-optical material' refers to a material whose optical characteristic is changed according to variation of electrical conditions, and particularly may include liquid crystal used for a liquid crystal display device, an EL material used for an EL device, and gas used for a plasma display device. Further, the 'display dot region' refers to a region, serving as a unit of display in the electro-optical device, and is formed, for example, of a region where a pair of electrodes facing each other overlap each other. In addition, the widthwise direction is a direction of a width provided between the display dot regions.

A material and formation timing for the laminated colored layers may be freely selected. Preferably, the colored layers are formed with the same material and formation timing as colored elements, which are components of a color filter mostly used when color display is performed in the electro-optical device. Further, the colored layers to be laminated can have, for example, three primary colors of blue (B), green (G), and red (R). In addition, they can have three colors of cyan (C), magenta (M), and yellow (Y).

According to the electro-optical device of the invention, one of the plurality of colored layers forming the light-shielding film protrudes from the edges of the other colored layers, so that the entire base color of display, i.e., a base color is apt to be determined by the color of the colored layer protruding outside. Further, even when misalignment occurs between different colored layers, a variation in the entire base color of display does not occur as long as the degree of misalignment is within the range of the protruding amount of the blue colored layer from the other colored layers. In other words, according to the electro-optical device of the invention, it is possible to prevent a variation in the entire base color displayed by the electro-optical device although misalignment occurs in the colored layers when the colored layers are laminated to form a light-shielding layer. Further, it is possible to widen a range in which misalignment is permitted during exposure when the light-shielding film is formed by a photolithography method.

In the above-mentioned structure, it is referable that the plurality of colored layers have three primary colors of blue, green, and red, and that the protruding colored layer be the blue colored layer. Blue is a color having a high optical density (OD) value, i.e., a color that visually appears to be darker than green and red. Therefore, when blue is selected as the color of the colored layer protruding outside, protruding the one colored layer outside makes it difficult to visually recognize a phenomenon that the entire color of display is heavy on a specific color.

Next, in the above-mentioned structure, it is preferable that the plurality of display dot regions each include a transmissive portion for transmitting light and a reflective portion that is formed closer to the light-shielding film than the transmissive portion to reflect light. In addition, preferably, the reflective portion partially overlaps the protruding colored layer, and one of the plurality of colored layers is provided in the transmissive portion.

The structure in which the display dot region has the transmissive and reflective portions has been known as a so-called transflective structure. In this structure, transmissive display is carried out by light passing through the transmissive portion to be incident on the electro-optical material. Meanwhile, reflective display is carried out by light reflected from the reflective portion to be incident on the electro-optical material.

In the transflective electro-optical device, when the colored elements are provided in both the transmissive portion and the reflective portion, respectively, it is possible to perform color display in both a transmissive mode and a reflective mode. In this transflective display, the brightness of display in reflective display is remarkably lowered as compared to that in transmissive display. In order to overcome this problem, there is proposed a technique where the colored element of the transmissive potion is formed in a dark color, and the colored element of the reflective portion is formed in a bright color.

Further, in order to form the colored elements of the reflective portion in the bright color, it is proposed to form a region where no colored element is provided in a part of the reflective portion, that is, to form a part of the reflective portion as a non-colored region. Moreover, it is proposed to remove the colored elements from the entire reflective portion to form the entire reflective portion as a non-colored region. In this case, color display is carried out in the transmissive portion of one display dot region, while white-and-black display is carried out in the reflective portion.

As described above, in a case in which a dark color is displayed on the transmissive portion in the display dot region, and a bright color or a white color is displayed on the reflective portion, when one of the plurality of colored layers forming the light-shielding film around the display dot region protrudes from the edges of the other colored layers due to misalignment, the colored layer protrudes toward the reflective portion in the display dot region. In this case, when the colored elements of a dark color are formed in the reflective portions, this may not cause a serious problem. However, when the reflective portion is formed with a bright color like the above-stated configuration, or when the entire reflective portion becomes a non-reflective region, i.e., a white display region, due to the removal of the colored elements, the color displayed on the display region formed by a set of display dot regions is considerably changed when one colored layer protrudes toward the reflective portion due to misalignment. Hence, this may visually have an adverse influence on a viewer.

In this regard, when one of the plurality of colored layers is formed such that both ends thereof in the widthwise direction protrude from the edges of the other colored layers as in the invention, an initial state of the base color of display may be greatly influenced by the color of the protruding colored layer. However, it is possible to prevent the base color of display from being considerably changed from its initial state even when positional deviation occurs in the colored layers within the light-shielding layer have deviation in position due to misalignment. When the reflective portion in the display dot region is formed in a bright or white color, a variation in color is easily perceived. In this case, according to the invention, it is also possible to reliably prevent the variation in the displayed color.

Next, in the electro-optical device having a structure where the display dot region has the transmissive portion and the reflective portion, it is preferable that the light-shielding film be formed by the same colored elements as those forming the colored region of the transmissive portion. In other words, it is preferable that the plurality of colored layers laminated to form the light-shielding film be formed with the same material and in the same process as those in which the colored elements constituting the color filter are formed. In this way, the light-shielding film can be formed at the same time when the color filter is formed. As a result, a process for fabricating the electro-optical device is not complex, and a material cost is not increased as well.

Further, in the above-mentioned structure, it is preferable that the light-shielding film be formed between the display dot regions corresponding to the same color among the plurality of display dot regions. This configuration corresponds to, for example, a configuration where the light-shielding film is formed between the display dot regions in a direction perpendicular to the data lines.

Furthermore, according to another aspect of the invention, an electro-optical device substrate includes a substrate; a plurality of display dot regions that is formed on the substrate; and a light-shielding film that is provided among the plurality of display dot regions, and that is formed by laminating a plurality of colored layers. In the electro-optical device substrate, one of the plurality of colored layers is formed such that both ends thereof in a widthwise direction protrude from edges of the other colored layers.

According to the electro-optical device substrate of the invention, any one of the plurality of colored layers forming the light-shielding film protrudes from the edges of the other colored layers. Therefore, when display is performed using the substrate, the entire color of the display is determined by the color of the colored layer protruding outside. Further, even when misalignment occurs between the colored layers having different colors, a variation in the entire color of display does not occur as long as the degree of the misalignment is within the range of the protruding amount of the blue colored layer from the other colored layers. In other words, according to the electro-optical device substrate of the invention, it is possible to prevent a variation in the entire color of display performed by using the substrate although positional deviation occurs in the colored layers when the colored layers having different colors are laminated to form the light-shielding layer. Further, it is possible to widen a range in which misalignment is permitted during exposure when the light-shielding film is formed by a photolithography method.

Moreover, according to still another aspect of the invention, an electronic apparatus includes the electro-optical device having the above-mentioned configuration. According to the electro-optical device of the invention, since any one of the plurality of colored layers forming the light-shielding film protrudes from the edges of the other colored layers, the entire color of display is apt to be determined by the color of the colored layer protruding outside. Further, even when misalignment in position occurs between different colored layers, a variation in the entire color of display does not occur as long as the degree of the misalignment is within the range of the protruding amount of the blue colored layer from the other colored layers. That is, according to the electro-optical device of the invention, although positional deviation occurs in the colored layers having different colors when the colored layers are laminated to form the light-shielding film, it is possible to prevent a variation in the entire display color of an electro-optical device. Thus, according to the electronic apparatus using the electro-optical device, it is possible to prevent a variation in a base color when various information items related on the electronic apparatus are displayed in colors.

BRIEF DESCRIPTION OF THE DRAWINGS

The invention will be described with reference to the accompanying drawings, wherein like numbers reference like elements, and wherein.

DESCRIPTION OF THE EMBODIMENTS

Figure 1:
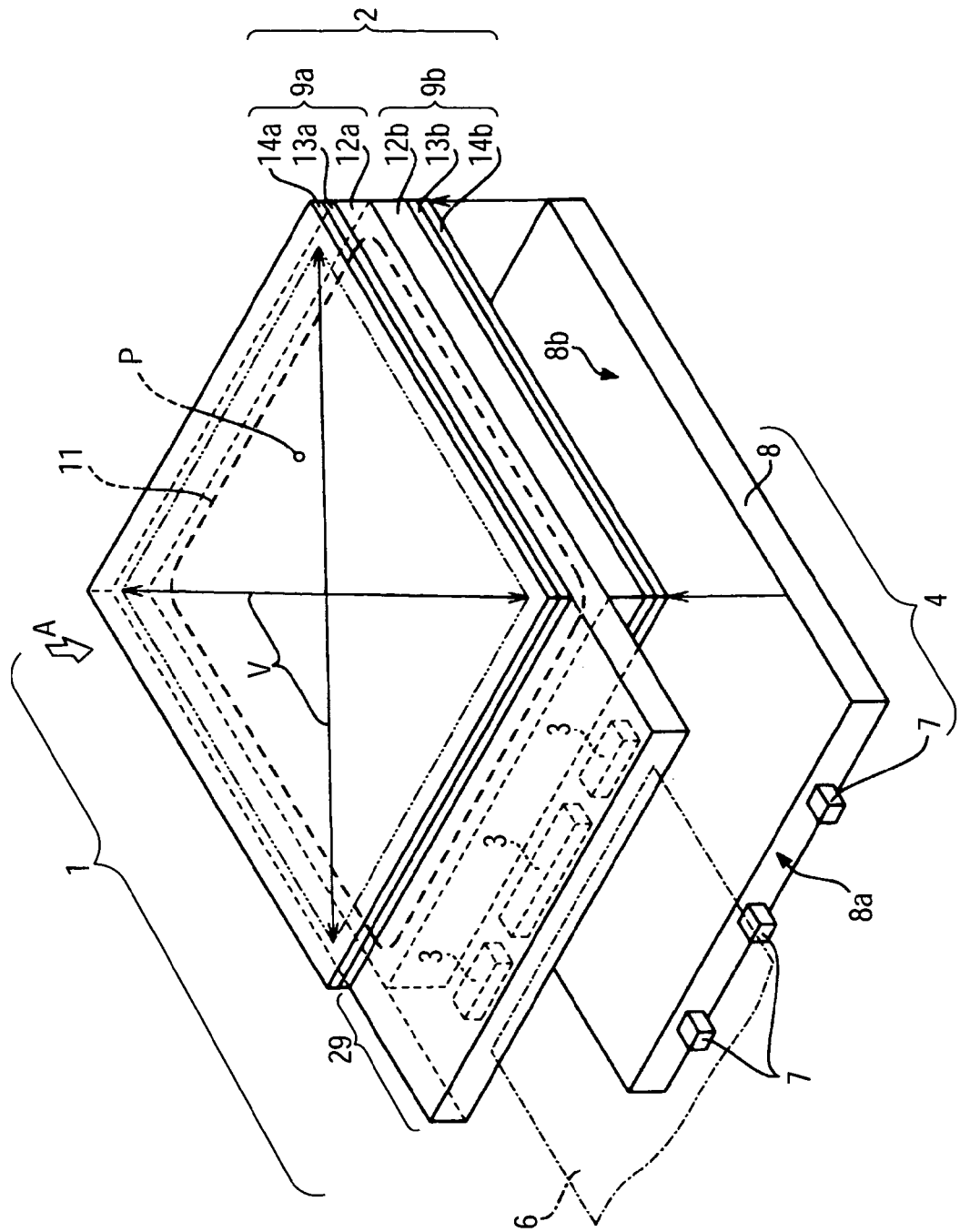
FIG. 1 is a perspective view showing an electro-optical device substrate and an electro-optical device in accordance with an embodiment of the invention.

First Embodiment of Electro-Optical Device Substrate and Electro-Optical Device

Hereinafter, an electro-optical device substrate and an electro-optical device according to the invention will be described using a liquid crystal display device as an example of the electro-optical device. Thus, it is natural that the invention be not limited to this embodiment. Further, it should be noted that the following description is made with reference to the drawings, and the scale of each layer or member has been adjusted in order to have a recognizable size in the drawings.

Figure 2:
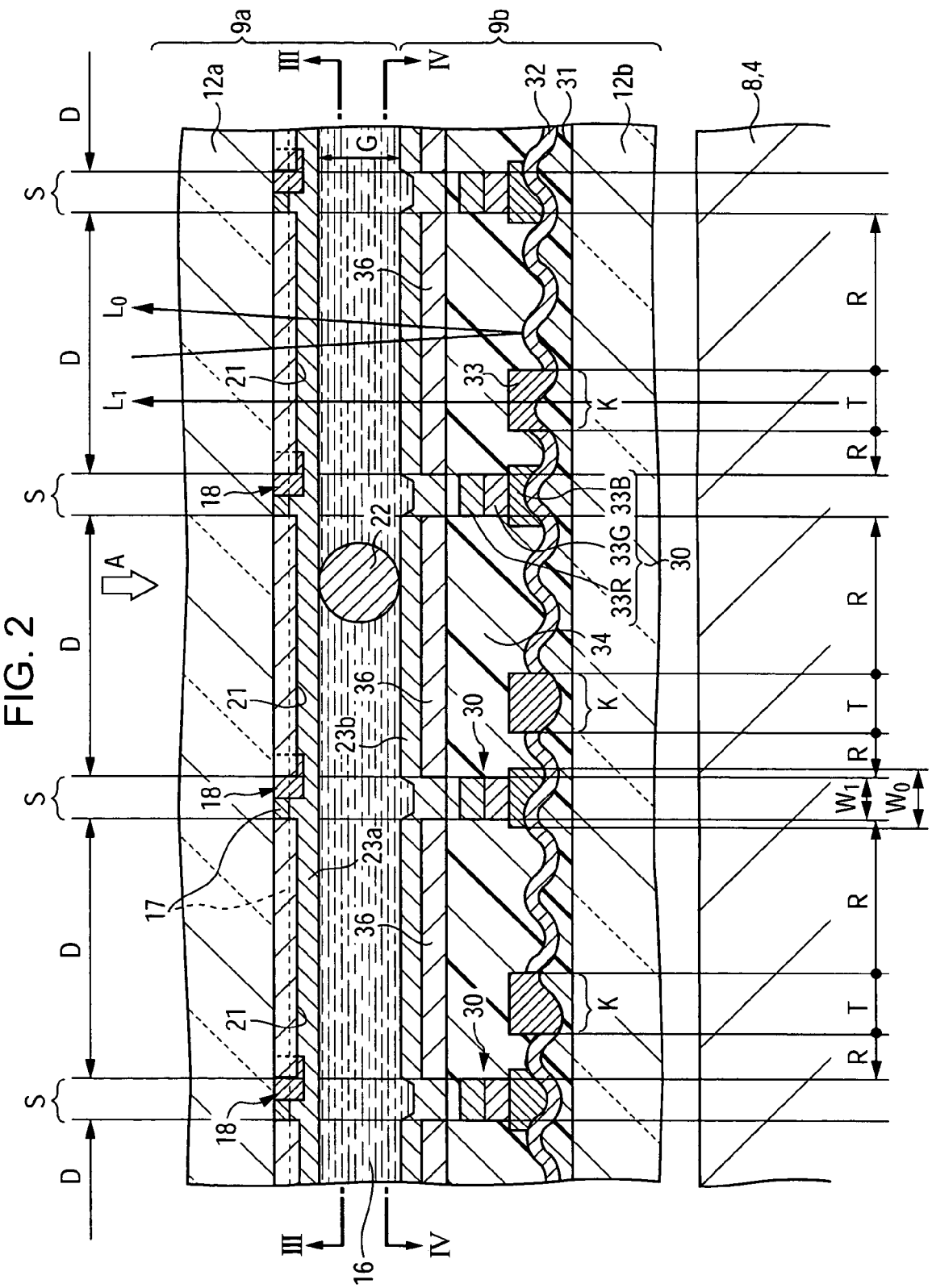
FIG. 2 is a cross-sectional view showing the structure of a pixel portion indicated by an arrow P shown in FIG. 1.
Figure 3:
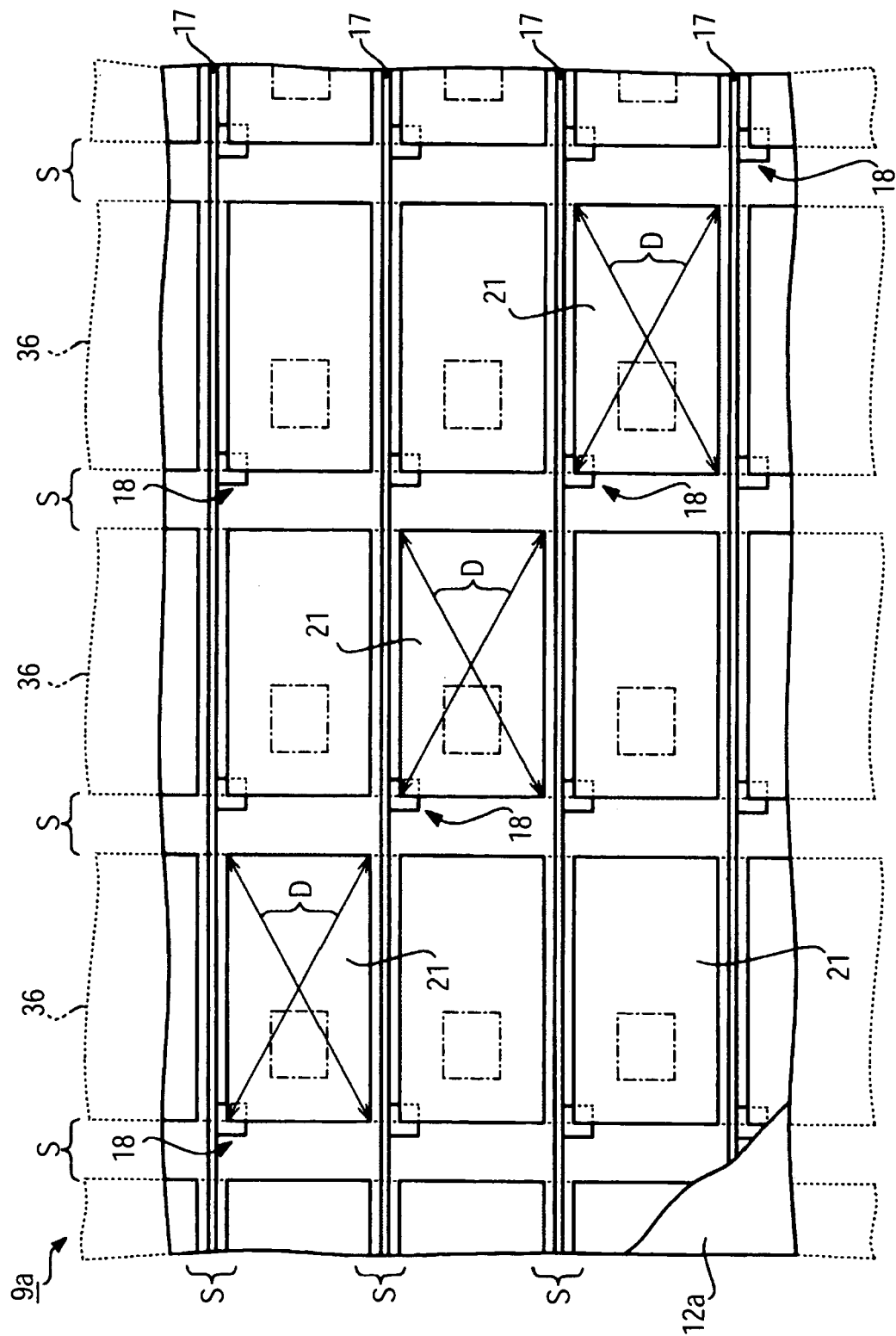
FIG. 3 is a plan view showing the structure of an element substrate, taken along the line III-III of FIG. 2.
Figure 4:
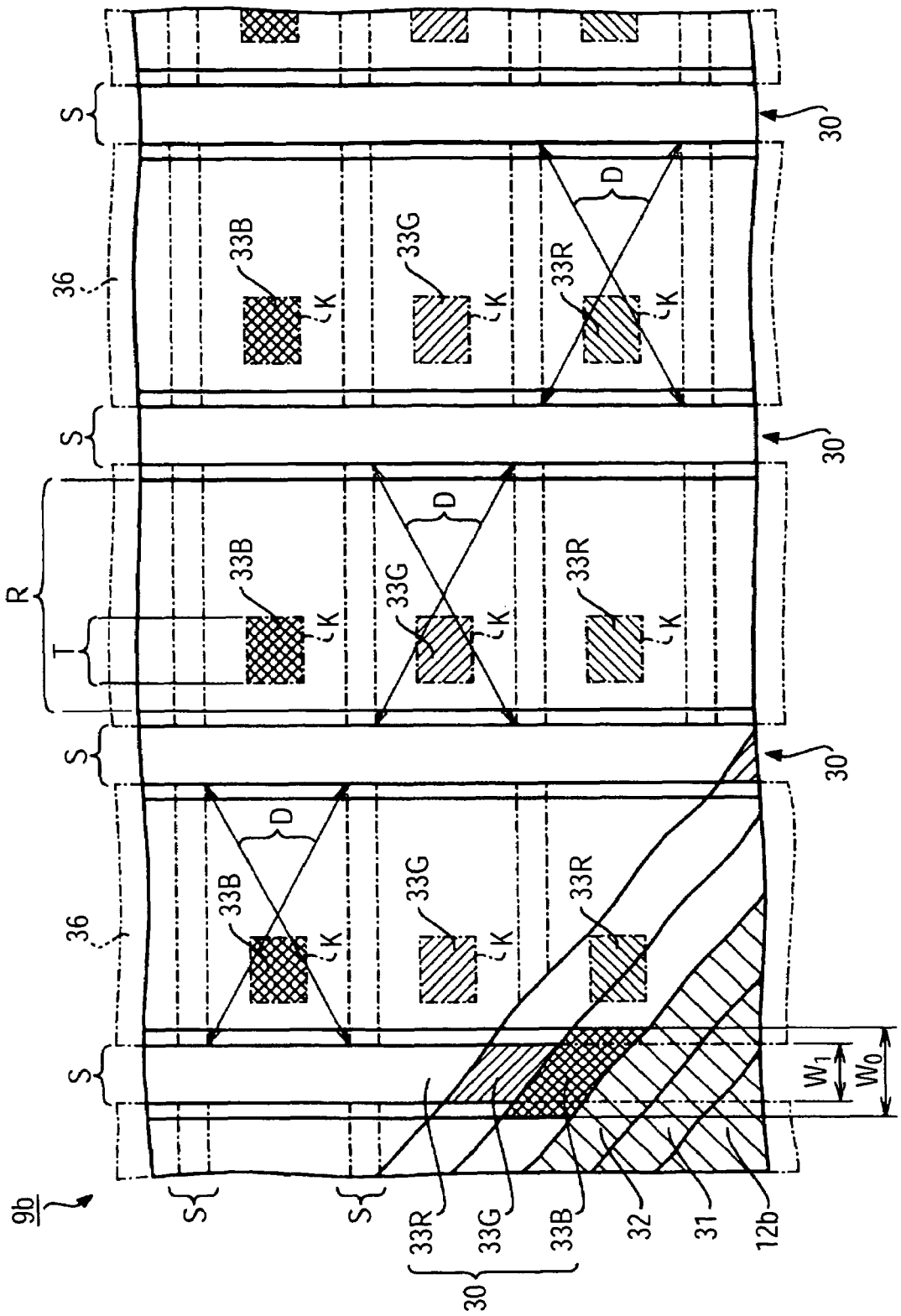
FIG. 4 is a plan view showing the structure of a color filter substrate, taken along the line IV-IV of FIG. 2.

FIG. 1 shows a liquid crystal display device, which is one example of an electric-optic device according to the invention. The liquid crystal display device is an active matrix liquid crystal display device in which thin film diodes (TFDs), which are two-terminal-type non-linear elements are used as switching elements. FIG. 2 shows the cross-sectional structure of a pixel portion represented by an arrow P in FIG. 1. Further, FIG. 3 shows the plan-view structure of an element substrate, taken along the line III-III of FIG. 2. Also, FIG. 4 shows the plan-view structure of a color filter substrate, taken along the line IV-IV of FIG. 2.

In FIG. 1, a liquid crystal display device 1, serving as the electro-optical device, includes a liquid crystal panel 2, serving as an electro-optical panel, a driving integrated circuit (IC) 3 mounted on the liquid crystal panel 2, an illuminating device 4 provided on the liquid crystal panel 2, and a flexible printed circuit (FPC) 6, as a wiring board, that is connected to an edge of the liquid crystal panel 2. The liquid crystal display device 1 is viewed from the side indicated by an arrow A. The illuminating device 4 includes a light emitting diode (LED) 7, serving as a light source, and an optical waveguide 8 for guiding light emitted from the LED 7 inwardly and for emitting the light toward the liquid crystal panel 2 as surface light. The illuminating device 4 is arranged on a rear side of the liquid crystal panel 2, as viewed in a direction indicated by an arrow A, and serves as a backlight.

The liquid crystal panel 2 is formed by bonding an element substrate 9a and a color filter substrate 9b with a seal material 11 having a square or rectangular frame shape. As shown in FIG. 2, a gap G, called a cell gap, is formed between the element substrate 9a and the color filter substrate 9b, and liquid crystal is sealed in the cell gap G, so that a liquid crystal layer 16 is formed. As the liquid crystal, for example, twisted nematic (TN) liquid crystal may be used. Further, the cell gap G is kept at a predetermined interval by spherical spacers 22.

In FIG. 1, the element substrate 9a has a first substrate 12a having a transmissive property. A retardation plate 13a is mounted on an outer surface of the first transmissive substrate 12a by, for example, an adhesive. Further, a polarizing plate 14a is mounted on the retardation plate 13a by, for example, an adhesive. Meanwhile, the color filter substrate 9b has a second substrate 12b having a transmissive property. A retardation plate 13b is mounted on an outer surface of the second transmissive substrate 12b by, for example, an adhesive. Further, a polarizing plate 14b is mounted on the retardation plate 13b by, for example, an adhesive. The first and second transmissive substrates 12a and 12b are made of, for example, glass or plastic.

As shown in FIG. 2, wiring lines 17, serving as data lines, TFD elements 18, serving as switching elements, dot electrodes 21, and an alignment film 23a are formed on an inner surface of the first transmissive substrate 12a, i.e., a surface thereof facing the liquid crystal layer. The alignment film 23a is made of, for example, polyimide, and a rubbing process is performed on a surface of the alignment film 23a. This rubbing process determines initial arrangement states of liquid crystal molecules around the element substrate 9a.

Figure 5:
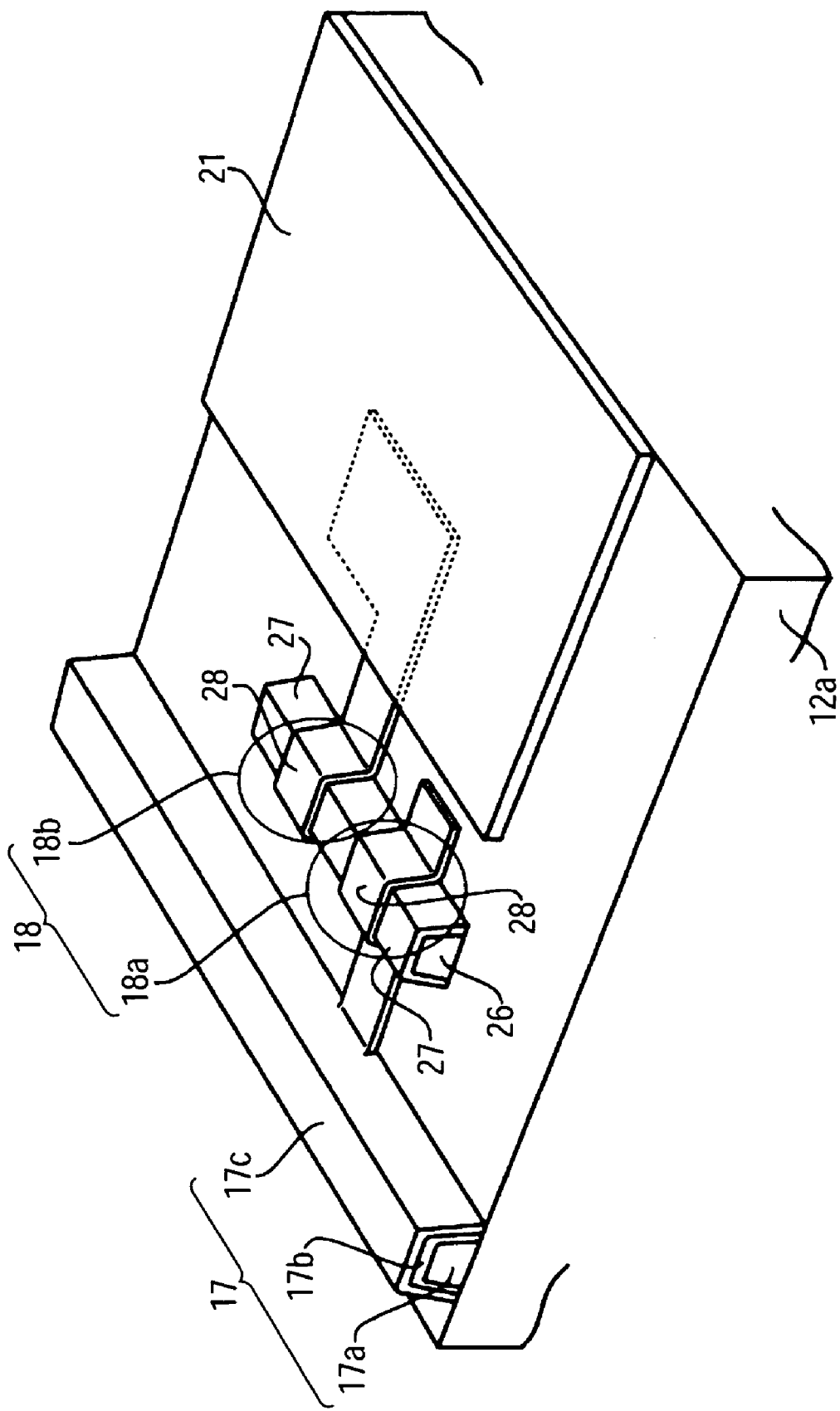
FIG. 5 is a perspective view showing a TFD element.

As shown in FIG. 5, the wiring line 17 is formed by laminating first, second, and third layers 17a, 17b, and 17c. Further, the TFD element 18 has first and second TFD elements 18a and 18b connected to each other in series. Each of the first and second TFD elements 18a and 18b has a first metal layer 26, an insulating film 27 and a second metal layer 28.

The first metal layer 26 of the TFD element 18 and the first layer 17a of the wiring line 17 are made of, for example, tantalum (Ta). Further, the insulating film 27 of the TFD element 18 and the second layer 17b of the wiring line 17 are oxidation films formed by, for example, an anodizing process.

In addition, the second metal layer 28 of the TFD element 18 and the third layer 17c of the wiring line 17 are made of, for example, chromium (Cr).

The second metal layer 28 of the first TFD element 18a and the third layer 17c of the wiring line 17 are made of the same material. Further, the dot electrode 21 is formed on the substrate 12a so as to be electrically connected to the second metal layer 28 of the second TFD element 18b. The dot electrode 21 is made of, for example, a metallic oxide, such as ITO (indium tin oxide).

As shown in FIG. 3, each of the plurality of wiring lines 17 extends in a straight line passing through the plurality of dot electrodes 21. Further, the plurality of wiring lines 17 are provided parallel to each other at predetermined gaps, and are formed in a stripe arrangement. In addition, the plurality of TFD elements 18 are provided along the wiring lines 17 at equal intervals to electrically connect the wiring lines 17 and the dot electrodes 21, respectively. However, the alignment film 23a of FIG. 2 is not shown in FIG. 3.

In FIG. 2, a resin layer 31 is formed on an inner surface of the second transmissive substrate 12b constituting the color filter substrate 9b, that is, a surface thereof facing the liquid crystal layer, and a reflective film 32 and a colored element 33 are formed thereon. In addition, an overcoat layer 34 is formed thereon, and a plurality of strip-shaped electrodes 36 is formed on the overcoat layer 34. Further, an alignment film 23b is formed thereon. The alignment film 23b is made of, for example, polyimide, and a rubbing process is performed on a surface of the alignment film 23b. This rubbing process determines initial alignment states of liquid crystal molecules around the color filter substrate 9b.

Each of the plurality of strip-shaped electrodes 36 extends in a direction perpendicular to the plane of FIG. 2, that is, in the vertical direction of the plane of FIG. 4. The strip-shaped electrodes 36 extend in a direction perpendicular to the wiring lines 17, as shown in FIG. 3. Further, the plurality of strip-shaped electrodes 36 are arranged parallel to each other at predetermined intervals in the horizontal direction of FIG. 2. In this way, the plurality of strip-shaped electrodes 36 are formed in a stripe arrangement, as viewed in the direction of the arrow A. As shown in FIG. 3, the strip-shaped electrodes 36 disposed in the stripe arrangement and the dot electrodes 21 arranged in a dot matrix overlap each other in plan view. A plurality of overlapped regions D constitute display dot regions, which are display units. The plurality of display dot regions D are arranged in a dot matrix in a region indicated by a letter V in FIG. 1. This region V is an effective display region of the liquid crystal display device 1. In the effective display region V, images, such as characters, numbers, figures, etc., are displayed.

In FIG. 2, unevenness is formed on a surface of the resin layer 31. Therefore, unevenness is also formed on a surface of the reflective film 32 laminated on the resin layer 31. The reflective film 32 is made of, for example, a light-reflective material, such as aluminum (Al), and reflects light incident in the direction of the arrow A. The unevenness formed on the reflective film 32 causes the light reflected from the reflective film 32 to be scattered.

The reflective film 32 has an opening K in the display dot region D. A region where the opening K is formed is a transmissive region T, and a region where the reflective film 32 is formed is a reflective region R. In the reflective region R, a light component L0 incident in the viewing direction indicated by the arrow A is reflected from the reflective film 32, and is then incident on the liquid crystal layer 16. On the other hand, in the transmissive region T, a light component L1 emitted from the illuminating device 4 passes through the opening K, and is then incident on the liquid crystal layer 16.

In this embodiment, the plurality of colored elements 33 formed on the resin layer 31 are provided only at positions corresponding to the openings K. Further, the plurality of colored elements 33 are provided in correspondence to the openings K belonging to the display dot regions D, respectively, as shown in FIG. 4. Each of the colored elements 33 is formed of a filter capable of transmitting light having any one of blue (B), green (G), and red (R), which are three primary colors. A set of R, G, and B colored elements 33 constitutes a color filter. A region other than the opening K in the display dot region D, i.e., the entire reflective region R, is not provided with any colored element 33. That is, the reflective region R is formed of a white-and-black display region rather than of a color display region.

Various methods have been proposed to array the plurality of colored elements 33 having different colors in plan view. However, as shown in FIG. 3, this embodiment employs a so-called stripe arrangement in which the display dot regions having the same colors B, G, and R are arranged in the extending direction of the wiring lines 17, that is, the data lines, and the display dot regions D having the respective colors B, G, and R are repeatedly arranged in this order in the extending direction of the strip-shaped electrodes 36, that is, the scanning lines. Of course, an arrangement other than the stripe arrangement, for example, a delta arrangement, a mosaic arrangement, or the like may be employed.

In FIG. 4, a region between the plurality of display dot regions D is configured of a lattice-shaped region S. This region S is a light-shielding region for increasing the contrast of display. Further, the B, G, and R colored elements 33(B), 33(G) and 33(R), which constitute the color filter as shown in FIG. 2, are laminated in the region S extending in a longitudinal direction of FIG. 4 to form a light-shielding film 30. On the other hand, in the region S extending in a transverse direction of FIG. 4, the wiring line 17 is disposed on the element substrate 9a of FIG. 3 opposite to the color filter substrate 9b of FIG. 4. Therefore, the wiring line 17 acts as a light-shielding element. For this reason, the light-shielding film may not be formed on the color filter substrate 9b of FIG. 4. Of course, the light-shielding film may be formed by laminating the colored elements 33 having different colors in the regions S extending in the traverse direction of the color filter substrate 9b shown in FIG. 4. Furthermore, the laminated structure of the light-shielding film 30 formed within the light-shielding region S is not limited to the laminated structure of three-color layers. Thus, a laminated structure of layers having any two colors of blue, green, and red may be used.

As shown in FIG. 2, the light-shielding region S is formed by laminating the colored elements 33 having three different colors. In this embodiment, when the color filter is formed, it is considered that, in FIG. 4, the respective colored elements 33 are formed in the order of blue (B), green (G) and red (R). Therefore, the light-shielding film 30 shown in FIG. 2 has a laminated structure of the blue (B), green (G), and red (R) colored elements in this order, as viewed from the second transmissive substrate 12b. In this embodiment, the blue colored element 33B has a width W0 larger than widths W1 of the other colored elements 33G and 33R. Further, the blue colored element 33B is formed such that both ends thereof in the widthwise direction protrude from both ends of each of the other colored elements 33G and 33R.

Figure 6:
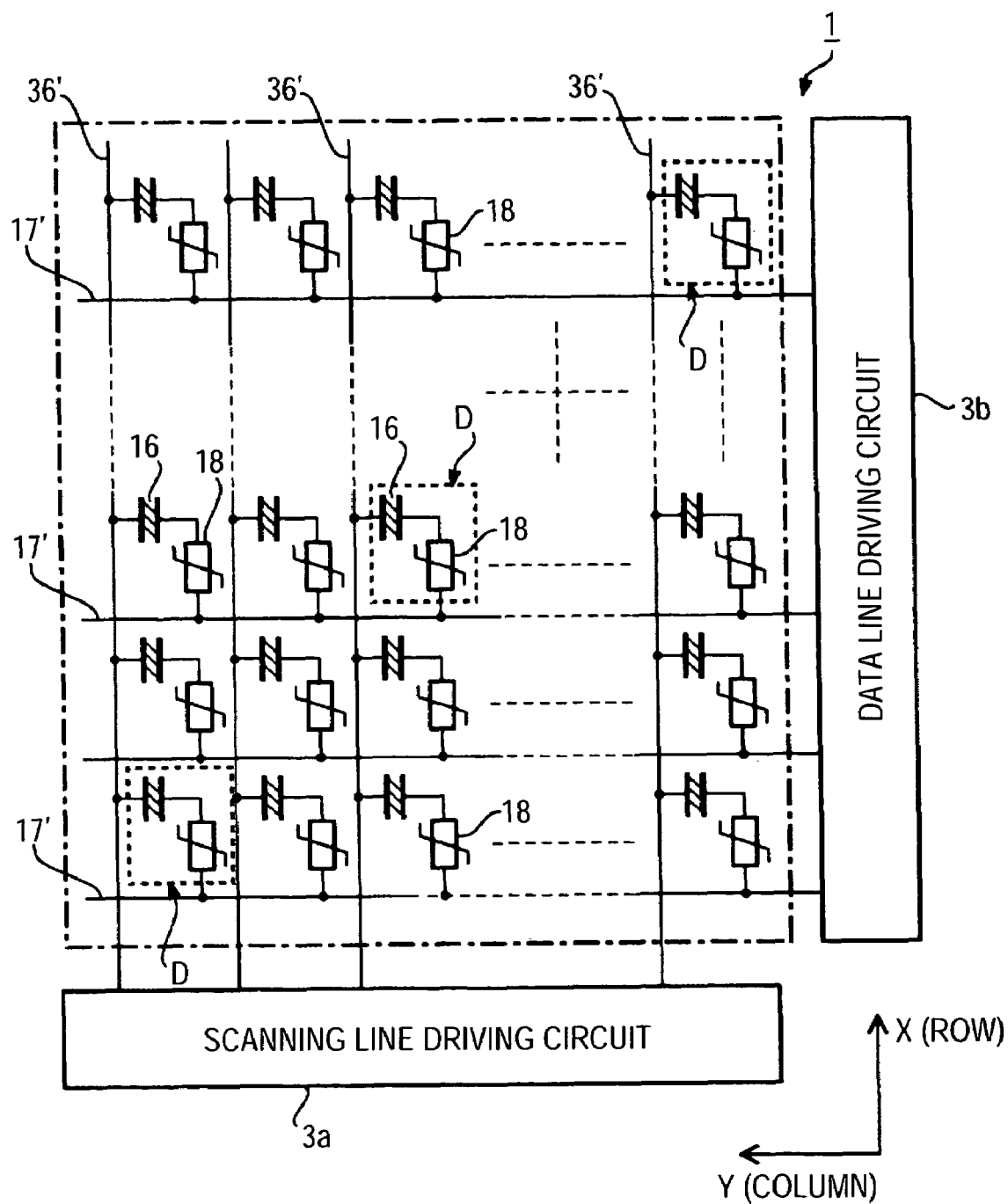
FIG. 6 is an equivalent circuit diagram of the liquid crystal display device 1 shown in FIG. 1.

FIG. 6 shows an equivalent electric circuit diagram of the liquid crystal display device 1 shown in FIG. 1. In FIG. 6, a plurality of scanning lines 36' is formed to extend in a row direction X, and a plurality of data lines 17, is formed to extend in a column direction Y. The scanning lines 36' are formed by the strip-shaped electrodes 36 on the color filter substrate 9b shown in FIG. 4, while the data lines 17' are formed by the wiring lines 17 on the element substrate 9a shown in FIG. 3. In FIG. 6, the display dot regions D are respectively formed corresponding to intersections of the scanning lines 36' and the data lines 17'. In each of the display dot regions D, the liquid crystal layer 16 and the TFD element 18 are connected to each other in series.

In this embodiment, the liquid crystal layer 16 is connected to the scanning lines 36', and the TFD elements 18 are connected to the data lines 17'. Further, the scanning lines 36' are driven by a scanning line driving circuit 3a, while the data lines 17' are driven by a data line driving circuit 3b. The scanning line driving circuit 3a and the data line driving circuit 3b are constructed by the driving ICs 3 shown in FIG. 1, respectively. As the driving IC 3, the same IC may be used for the two driving circuits 3a and 3b may be used, or different ICs may be used for the two driving circuits 3a and 3b.

According to the liquid crystal display device 1 having the above-mentioned structure, when the liquid crystal display device 1 shown in FIG. 1 is disposed in a bright place, reflective display is performed using external light, such as sunlight or illumination light. On the other hand, when the liquid crystal display device 1 is disposed in a dark place, transmissive display is performed using the illuminating device 4 as a backlight.

When the reflective display is performed, in FIG. 2, an external light component L0 incident on the liquid crystal panel 2 through the element substrate 9a in the direction of a viewing side A passes through the liquid crystal layer 16 to be incident on the color filter substrate 9b. Then, the external light component L0 is reflected from the reflecting film 32 in the reflective region R, and travels toward the liquid crystal layer 16 again. In this embodiment, as shown in FIGS. 2 and 4, since the colored element 33 is not provided in the reflective region R of the display dot region D, the attenuation of light becomes small, and thus bright reflective light is obtained.

On the other hand, when the transmissive display is performed, the LED 7 of the illuminating device 4 shown in FIG. 1 is turned on, so that light emitted from the LED 7 is introduced through a light incident surface 8a of the optical waveguide 8 into the optical waveguide 8. Then, the light is emitted from a light emission surface 8b as surface light. This emission light passes through the opening K in the transmissive region T, and is then incident on the liquid crystal layer 16, as represented by a symbol L1 in FIG. 2.

While the light is being transmitted toward the liquid crystal layer 16 in this configuration, a predetermined voltage is applied to the display dot regions D specified by scanning signals and data signals between the dot electrodes 21 on the element substrate 9a and the strip-shaped electrodes 36 on the color filter substrate 9b. Thereby, the alignment of liquid crystal molecules of the liquid crystal layer 16 is controlled in each display dot region D between a TN structure and vertical alignment, so that the light incident on the liquid crystal layer 16 is modulated in each display dot region D. When the modulated light passes through the polarizing plate 14a on the element substrate 9a (See FIG. 1), the light can or cannot pass through each display dot region D according to a polarization characteristic of the polarizing plate 14a. Thereby, images, such as characters, numbers, and figures, are displayed on the surface of the element substrate 9a, so that they can be visually recognized from the direction of the arrow A.

According to the above-mentioned embodiment, in FIG. 2, the blue colored layer 33B of the plurality of colored layers 33B, 33G and 33R constituting the light-shielding film 30 has the width W0 larger than the widths W1 of the other colored layers 33G and 33R so that both ends thereof in the widthwise direction protrude from the edges of the colored layers 33G and 33R. As a result, the entire base color displayed by the liquid crystal display device 1 becomes the color of the colored layer protruding outside, i.e., blue. In general, many people have a preference of blue over the other two colors, i.e., green and red in the colors displayed on a screen of a general television set.

The respective colored layers 33B, 33G and 33R are formed by a photolithography method in an alignment state. However, positional deviation inevitably occurs in the alignment state during an actual fabricating process. Although the positional deviation occurs, the entire base color of display does not greatly vary from blue as long as the amount of the positional deviation is within a protruding amount P (P=W0−W1) of the blue colored layer 33B from the other colored layers 33G and 33R. Further, the protruding amount P is preferably set to a range of 1 to 5 μm. When exposure is performed using a batch exposure apparatus, the protruding amount P is more preferably set to about 3 μm.

Specifically, according to the liquid crystal display device 1 of the present embodiment, although positional deviation occurs in the colored layers 33B, 33G, and 33R when the light-shielding film 30 is formed by laminating the colored layers 33B, 33G, and 33R, it is possible to prevent the generation of a variation in a base color displayed by the liquid crystal display device 1. Further, the width W0 of the blue colored layer 33B is set larger than those of the other colored layers. Therefore, it is possible to widen a permitted range of misalignment during exposure when the respective colored layers are laminated to form the light-shielding film 30 by means of the photolithography method.

In addition, instead of the blue colored layer, the green or red colored layer may be increased in width. However, from the viewpoint of an optical density (OD) value, it has been known that blue has the largest OD value over the other colors, and thus is recognized as a dark color. Therefore, in order to prevent a variation in the recognition state of colors due to the misalignment of the colored layers, it is preferable to increase the size of the blue colored layer.

Further, in this embodiment, as shown in FIGS. 2 and 4, the entire surface of the reflective region R in the display dot region D is formed of a non-colored region. As such, when the reflective region R is formed of the non-colored region, and when only one of the blue, green, and red colored layers protrudes from the light-shielding film 30, the color of the protruding colored layer is easily perceived, because the reflective region R is the non-colored region. In this case, when only one of the colored layers is formed to have a larger width, as in this embodiment, a displayed color is apt to be heavy on the color of the colored layer having a larger width, but it is possible to prevent a variation in colors to be displayed due to the misalignment of the colored layers.

Modifications

In the embodiment of FIG. 2, the light-shielding film 30 is formed by the three colored layers 33B, 33G, and 33R. Instead of this structure, the light-shielding film 30 may be formed by two colored layers. In this case, one of the two colored layers is formed to have a larger width. In addition, the light-shielding film 30 may be formed by four or more colored layers. Further, the colored layers may be formed on any one of a pair of substrates having a layer composed of an electro-optical material interposed therebetween.

Also, in the embodiment of FIG. 2, the blue colored layer 33B of the three colored layers 33B, 33G, and 33R is formed to have a larger width than the other colored layers. Alternatively, one of the green and red colored layers may be formed to have a larger width that the other colored layer.

Figure 7:
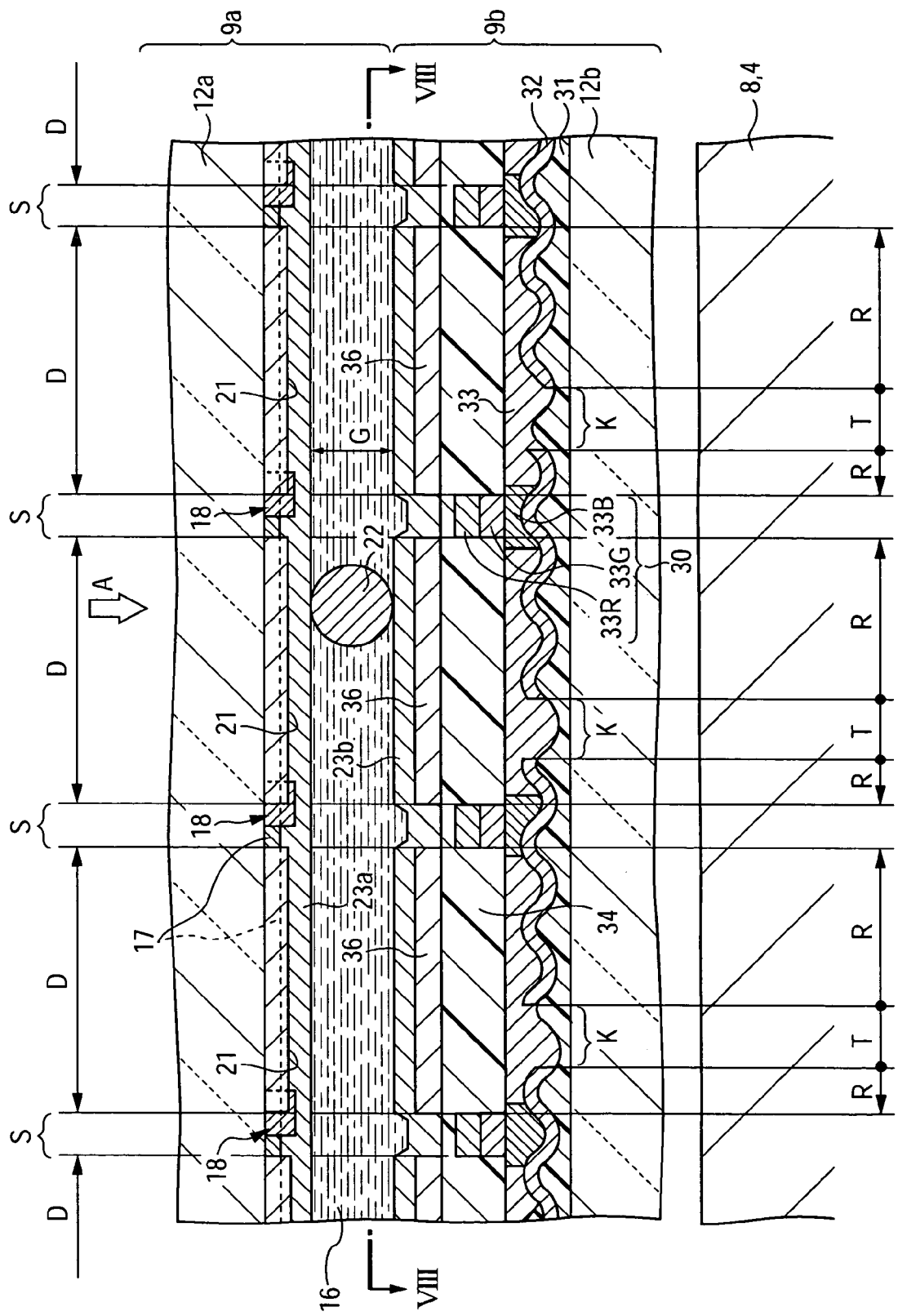
FIG. 7 is a cross-sectional view showing main parts of an electro-optical device substrate and an electro-optical device in accordance with another embodiment of the invention.
Figure 8:
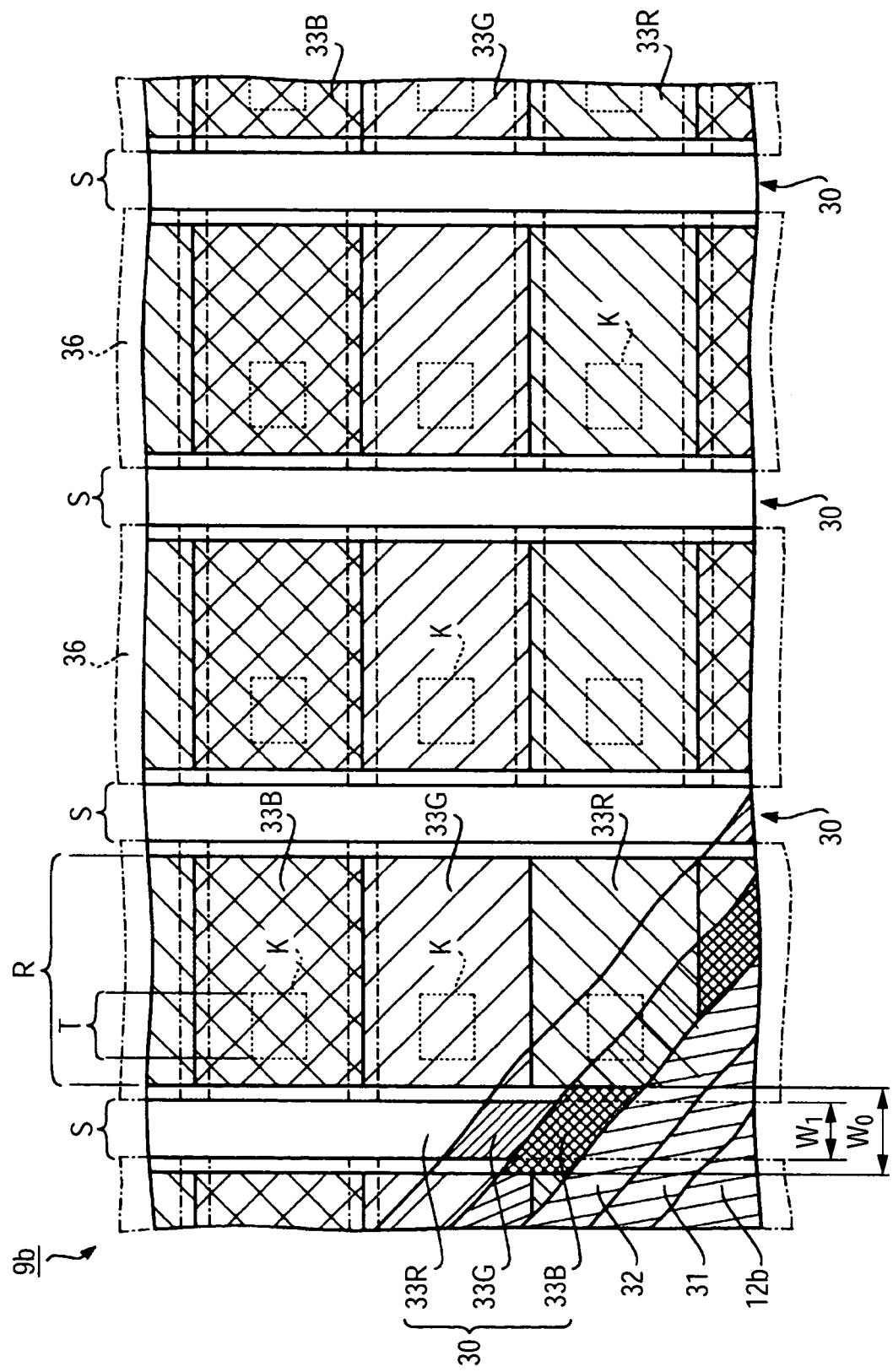
FIG. 8 is a cross-sectional view showing the structure of a color filter substrate, taken along the line VIII-VIII of FIG. 7.

Second Embodiment of Electro-Optical Device Substrate and Electro-Optical Device FIG. 7 shows a main part of another embodiment of an electro-optical device substrate and an electro-optical device in accordance with the invention. The second embodiment will be described using a liquid crystal display device as an example of an electro-optical device. In this embodiment, the liquid crystal display device has the same external appearance as the liquid crystal display device 1 shown in FIG. 1. Parts shown in FIG. 7 are similar to those shown in FIG. 2. Further, FIG. 8 shows the plane-view structure of a color filter substrate, taken along the line VIII-VIII of FIG. 7. The plane-view structure of an element substrate taken along the line IX-IX of FIG. 7 is the same as that shown in FIG. 3.

The second embodiment shown in FIGS. 7 and 8 is different from the first embodiment shown in FIGS. 2 and 4 in that the reflective region R in the display dot region D is composed of a non-colored region, that is, a region where the colored element 33 is not provided, in the first embodiment, but the colored element 33 is provided in the reflective region R in the second embodiment. Therefore, the invention can be applied to a liquid crystal display device having a color filter structure in which the reflective region R is not composed of a non-reflective region. In the liquid crystal display device in which the reflective region R is not composed of the non-reflective region, the display tends to be dark when reflective display is performed, which makes it possible to obtain deep color display.

In the liquid crystal display device of the second embodiment, among colored layers 33B, 33G, and 33R forming a light-shielding film 30, the blue colored layer 33B is formed such that both ends thereof in the widthwise direction protrude from the edges of the other colored layers. Therefore, although misalignment occurs when the colored layers 33B, 33G and 33R are formed in turn by a photolithography method, the two colored layers other than the blue colored layer do not protrude outside the light-shielding film 30 as long as the misalignment is within a permitted limit. Thus, even if the misalignment occurs, a base tone of a displayed color does not deviate from blue. As a result, a liquid crystal display device can achieve stable display colors.

Other Embodiments of Electro-Optical Device

The preferred embodiment of the invention have been described above. However, the invention is not limited thereto, and various modifications and changes can be made without departing from the spirit and scope of the invention as set forth in the claims.

For example, the TN liquid crystal is used in the above-described embodiments. However, the invention can be applied to a liquid crystal display device using STN (super twisted nematic) liquid crystal. Further, the invention can be applied to a liquid crystal display device using bi-stable liquid crystal having a memory characteristic, such as BTN (bi-stable twisted nematic) liquid crystal or ferroelectric liquid crystal, or polymer-dispersion-type liquid crystal. In addition, the invention can be applied to a liquid crystal display device using GH (guest host) liquid crystal in which a dye (a so-called guest) having anisotropy in the absorption of visible light in the major and minor axes of molecules is solved in liquid crystal (a so-called host) having a predetermined molecular arrangement, and then dye molecules are arranged parallel to liquid crystal molecules. Moreover, the invention can be applied to a transmissive or reflective liquid crystal display device as well as the transflective liquid crystal display device.

Further, the invention can be applied to a liquid crystal display device using liquid crystal of a vertical alignment type (a so-called homeotropic alignment type) in which liquid crystal molecules are arranged in a direction perpendicular to both substrates when no voltage is applied, while the liquid crystal molecules are arranged in a direction parallel to both the substrates when a voltage is applied. Moreover, the invention may be applied to a liquid crystal display device using liquid crystal of a parallel or horizontal alignment type (a so-called homogeneous alignment type) in which liquid crystal molecules are arranged in a direction parallel to both substrates when no voltage is applied, while the liquid crystal molecules are arranged in a direction perpendicular to both the substrates when a voltage is applied. Also, the invention may be applied to a liquid crystal display device of a transverse electric field type.

Furthermore, in the above-described embodiments, the TFD elements, which are two-terminal-type elements, are used as switching elements. However, two-terminal-type elements other than the TFD elements or three-terminal-type elements, such as TFTs (thin film transistors), can be used as switching elements. Further, the invention can be applied to a simple-matrix-type liquid crystal display device in which no switching element is used. On the other hand, the transmissive region is not limited to the opening, but it may be a region where the reflecting film formed in the display dot region is not provided. Further, in the above-described embodiments, the protruding colored layer overlaps the electrode at both sides of the light-shielding film. However, even when the colored layer overlaps the electrode only at one side of the light-shielding film, the same effects as described above can be obtained.

Further, in the above-described embodiments, the liquid crystal display device is exemplified as an electro-optical device. However, the invention can be applied to various electro-optical devices, such as an organic EL device, an inorganic EL device, a plasma display device, an electrophoresis display device, and a field emission display device (that is, a field emission display).

Embodiment of Electronic Apparatus

Hereinafter, an embodiment of an electronic apparatus according to the invention will be described. Further, this embodiment is just an illustrative example of the invention, but the invention is not limited thereto.

Figure 9:
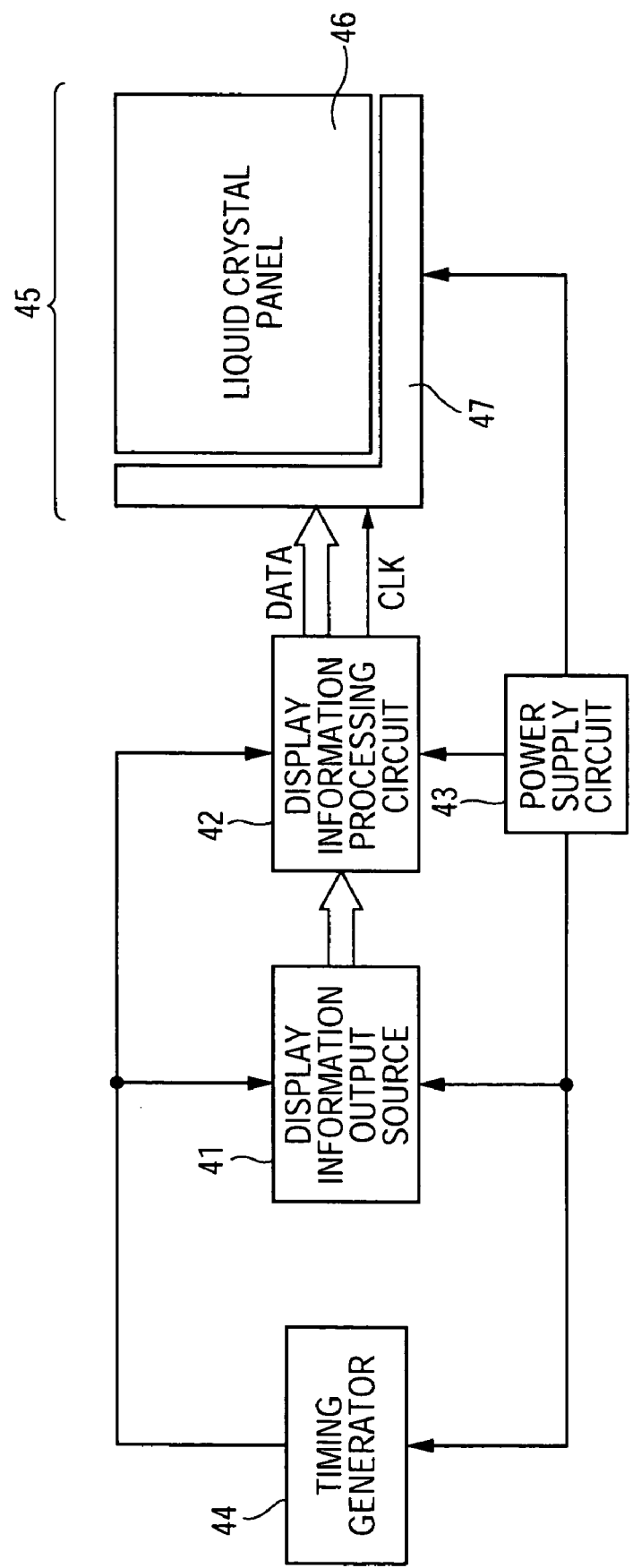
FIG. 9 is a block diagram showing an embodiment of an electronic apparatus according to the invention.

FIG. 9 shows an embodiment of an electronic apparatus according to the invention. The electronic apparatus shown in FIG. 9 includes a display information output source 41, a display information processing circuit 42, a power supply circuit 43, a timing generator 44, and a liquid crystal display device 45. The liquid crystal display device 45 is provided with a liquid crystal panel 46 and a driving circuit 47.

The display information output source 41 includes a memory, such as a RAM (random access memory), a storage unit including a variety of discs, a tuning circuit for tuning and outputting digital image signals, and so on. The display information output source 41 supplies display information, such as video signals having a predetermined format, to the display information processing circuit 42, based on various clock signals generated by the timing generator 44.

Next, the display information processing circuit 42 includes well-known various circuits, such as an amplifying/inverting circuit, a rotation circuit, a gamma correction circuit, and a clamping circuit, to process input display information, and then supplies image signals along with a clock signal (CLK) to the driving circuit 47. Here, the driving circuit 47 includes a scanning line driving circuit, a data line driving circuit, a test circuit, and so on. In addition, the power supply circuit 43 supplies a predetermined voltage to the above-mentioned components.

The liquid crystal display device 45 may be constructed, for example, using the liquid crystal display device 1 shown in FIG. 1. In the liquid crystal display device 1, in FIGS. 2, 4, 7 and 8, when the light-shielding film 30 is formed by laminating a plurality of colored layers 33, any one of the colored layers is formed to have a width wider than those of the other colored layers, so that the base color of display is stabilized. Thus, the electronic apparatus using the liquid crystal display device 1 can stabilize the base color of display.

Figure 10:
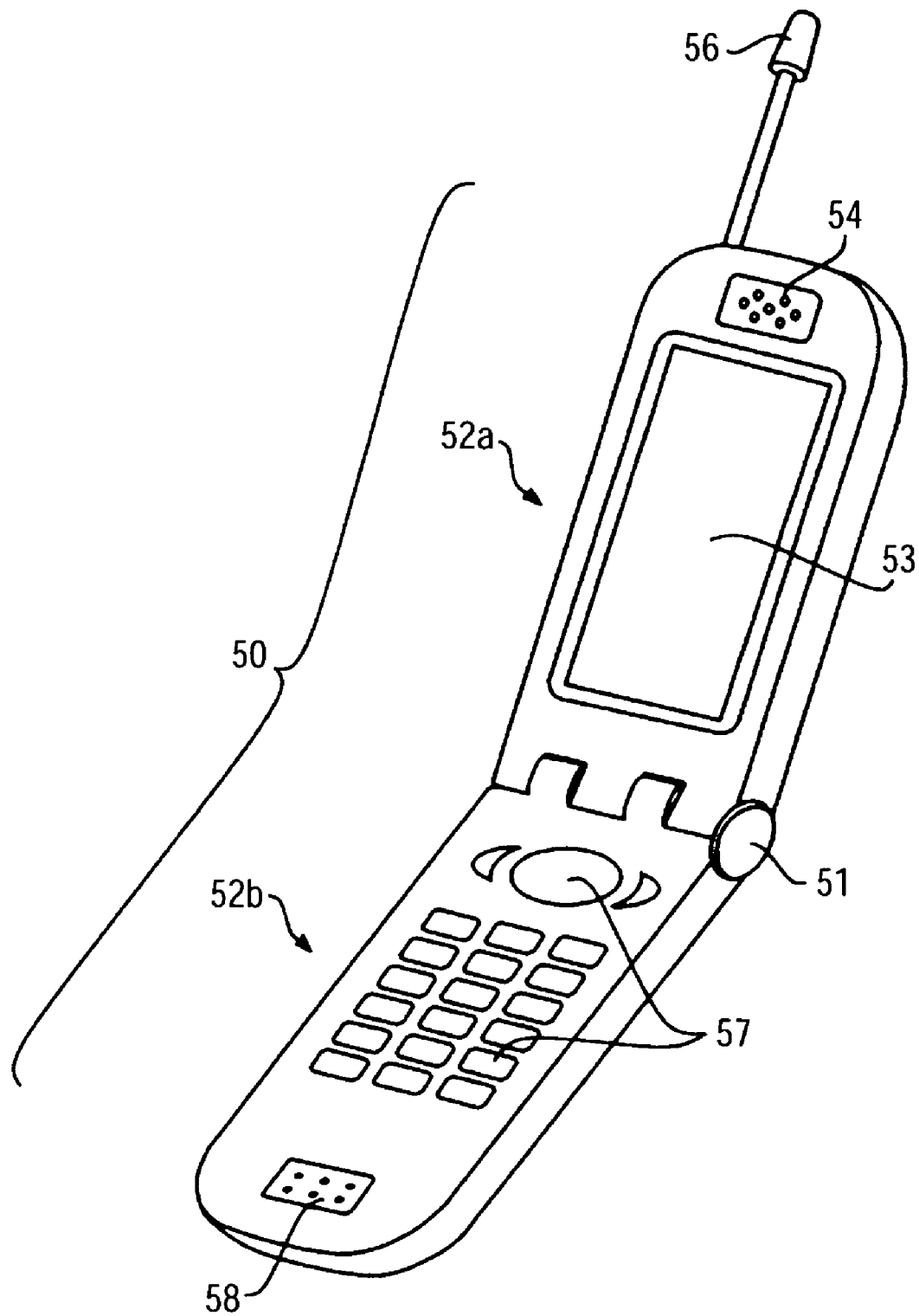
FIG. 10 is a perspective view showing another embodiment of the electronic apparatus according to the invention.

FIG. 10 shows a mobile phone, which is another embodiment of the electronic apparatus according to the invention. A mobile phone 50 shown FIG. 10 has first and second bodies 52a and 52b which can be folded with a hinge 51 used as a shaft. The first body 52a is provided with a liquid crystal display device 53, an earpiece 54, and an antenna 56. The second body 52b is provided with a plurality of operation buttons 57 and a mouthpiece 58. When the liquid crystal display device 53 is constructed using the liquid crystal display device 1 shown in FIG. 1, the base color of display can be stabilized.

Other Embodiments of Electronic Apparatus

The invention can be applied to the following electronic apparatuses, in addition to the mobile phone: a personal computer, a liquid crystal television, a viewfinder-type or monitor-direct-view-type videotape recorder, a car navigation system, a pager, an electronic organizer, an electronic calculator, a word processor, a workstation, a television phone, a POS terminal, and the like.

The electro-optical device substrate according to the invention is suitably used to fabricate an electro-optical device, such as a liquid crystal device. Further, the electro-optical device according to the invention is suitably used as a display unit for performing display in various electronic apparatus, such as a mobile phone and a personal digital assistant. In addition, the electronic apparatus according to the invention is used for personal electronic apparatuses, such as a mobile phone and a personal digital assistant, measuring apparatuses, and industrial instruments.

What is claimed is:

1. An electro-optical device comprising:
  a substrate;
  a plurality of display dot regions including a first display dot region and a second display dot region that are adjacent to each other; and
  a light-shielding film that is between the first and second display dot regions and that is formed by laminating a first colored layer and a second colored layer, the first and second colored layers have different colors, the first colored layer and the second colored layer each have opposite ends wherein one of the opposite ends faces the first display dot region and the other of the opposite ends faces the second display dot region, both of the opposite ends of the first colored layer protrude beyond both of the opposite ends of the second colored layer.

2. The electro-optical device according to claim 1, further comprising a third colored layer;
  wherein the first, second, and third colored layers are blue, green, and red respectively.

3. The electro-optical device according to claim 1, wherein the plurality of display dot regions each include a transmissive portion for transmitting light and a reflective portion that reflects light, the reflective portion is closer to the light-shielding film than the transmissive portion;
  the first colored layer partially overlaps the reflective portion; and
  one of the first and second colored layers is provided in the transmissive portion.

4. The electro-optical device according to claim 1, wherein the first display dot region and the second display dot region correspond to the same color.

* * * * *